United States Patent

[11] 3,614,341

[72] Inventor Lee E. Cannon
Bozeman, Mont.

[21] Appl. No. 848,027
[22] Filed Aug. 6, 1969
[45] Patented Oct. 19, 1971

[73] Assignee Darrell S. Smith
Cut Bank, Mont.

[54] CIRCUITRY FOR PROVIDING ONE ADDITIONAL COMPLETE PLAYBACK OF A RECORDED MESSAGE FOR EACH INPUT SIGNAL
8 Claims, 1 Drawing Fig.

[52] U.S. Cl. .......... 179/100.2 S, 307/239, 317/148.5 B

[51] Int. Cl. .......... G11b 15/18, H03k 17/56, H01h 47/32

[50] Field of Search .......... 179/100.2 S, 100.3 D; 317/148.5 B; 307/239

[56] References Cited

UNITED STATES PATENTS

| | | | |
|---|---|---|---|
| 3,134,089 | 5/1964 | Bogoff et al. | 179/100.2 S |
| 3,200,258 | 8/1965 | Carroll | 317/148.5 |

*Primary Examiner*—Terrill W. Fears
*Assistant Examiner*—Raymond F. Cardillo, Jr.
*Attorney*—Merchant & Gould

ABSTRACT: A tape playback head in conjunction with a continuous prerecorded magnetic tape for providing an output signal each time the tape makes a complete revolution, said signal being utilized to stop conduction in an SCR upon the first occurrence thereof and the second occurrence being allowed to pass through the SCR circuit to the base of a transistor to cut off the transistor and open a relay circuit to remove power from the tape-driving mechanism. Turning on the tape-driving apparatus, triggers the SCR to produce conduction therein and prevent passage of signals through the circuit thereof until conduction in the SCR is again stopped by the first signal. Thus, the continuous tape is allowed to make two complete revolutions and actuating the energizing switch during the second revolution resets the circuitry so that an additional revolution will be made.

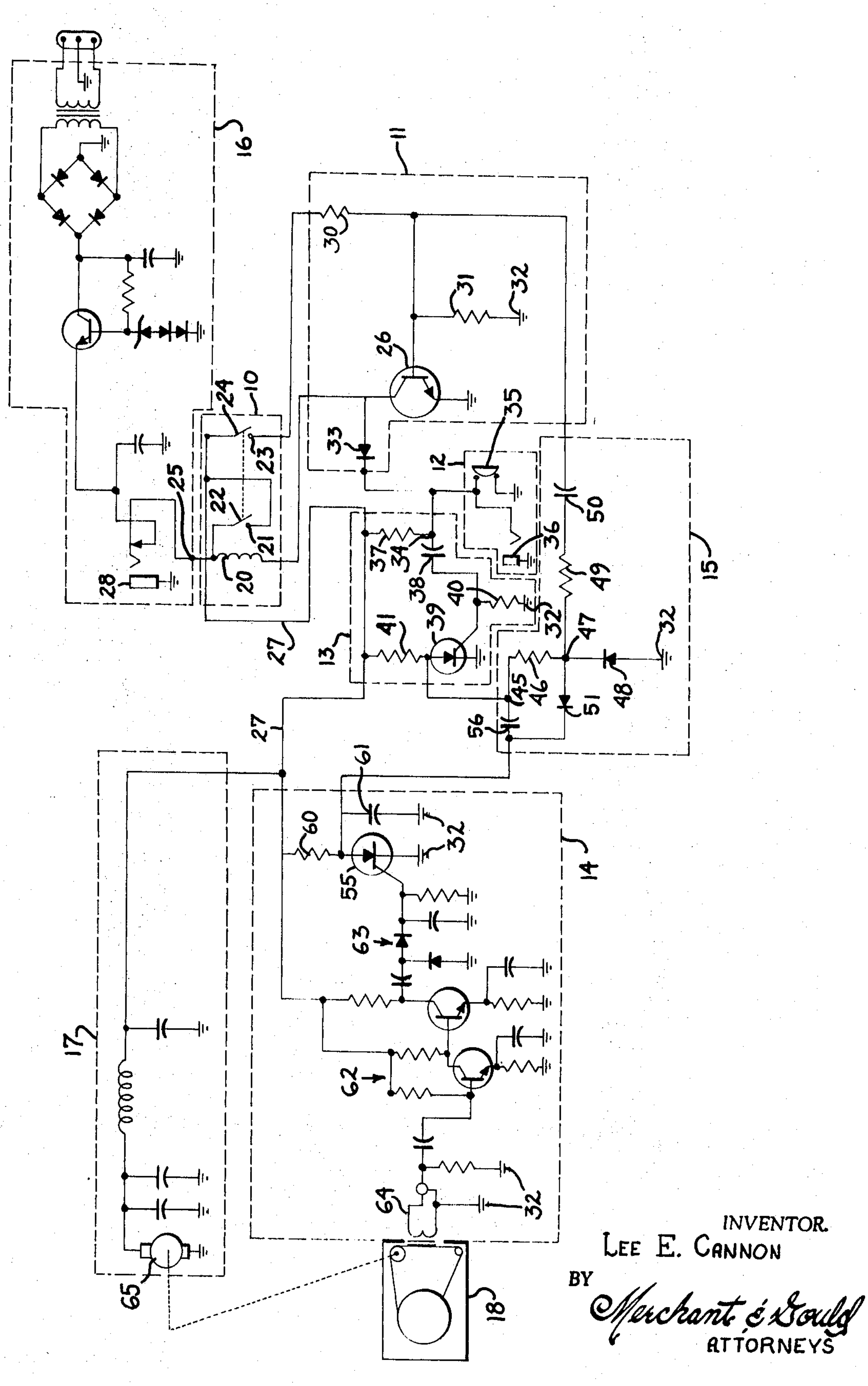
INVENTOR.
LEE E. CANNON
BY *Merchant & Gould*
ATTORNEYS

CIRCUITRY FOR PROVIDING ONE ADDITIONAL COMPLETE PLAYBACK OF A RECORDED MESSAGE FOR EACH INPUT SIGNAL

BACKGROUND OF THE INVENTION

1. Field of the Invention

The present invention pertains to sequencing circuitry especially for use with continuous tape recorders and the like, so that each time the apparatus is energized or activated the tape recorder or the like will play back the recorded message a predetermined number of times or in a predetermined sequence.

2. Description of the Prior Art

In the prior art the switching circuitry was either extremely elaborate and, therefore, inefficient and unreliable, or, for the example of recorded messages, prerecorded messages are simply recorded the number of times it is desired to repeat them and the tape or other carrier is simply operated through a single revolution and stopped. In either case the prior art apparatus is unsatisfactory because it is undependable and requires a large amount of space for the storage thereof or it greatly reduces the amount of space available for recorded messages.

SUMMARY OF THE INVENTION

The present invention pertains to an electronic sequencing circuit including switching means having a gate circuit for switching from a nonconducting to a conducting state upon the application of a signal thereto, condition responsive means connected to said gate circuit to momentarily apply electrical power thereto upon the occurrence of a predetermined condition and connecting means adapted to receive reoccurring pulses of a polarity and magnitude sufficient to return said switching means to the nonconducting state, said connecting means being attached to said switching means so that said switching means prevents the passage of said reoccurring pulses therethrough in the further circuitry state and the first pulse places the switching means in the nonconducting state so that a subsequent pulse can pass through the connecting means and be utilized to control further circuitry.

It is an object of the present invention to provide new and improved electronic sequencing circuitry.

It is a further object of the present invention to provide electronic sequencing circuitry which will automatically control tape recorders and the like, and especially those utilizing continuous tapes, to replay the tape a predetermined number of times each time a condition occurs or the circuitry is reset.

These and other objects of this invention will become apparent to those skilled in the art upon consideration of the accompanying specification, claims and drawing.

BRIEF DESCRIPTION OF THE DRAWING

Referring to the drawing, the single FIGURE illustrates a schematic electrical diagram of the sequencing circuit.

DESCRIPTION OF THE PREFERRED EMBODIMENT

In the FIGURE, an electronic sequencing circuit is illustrated in conjunction with a magnetic tape recording apparatus utilizing a continuous magnetic tape. It should be understood that this particular adaption of the sequencing circuit is illustrated only for exemplary purposes and many other uses may be devised by those skilled in the art. In the present adaption the circuitry contains first switching means 10, semiconductor means 11, condition responsive means 12, second switching means 13, sensing means 14, connecting means 15, a power supply 16, a motor circuit 17 and a tape-driving unit 18. Each of the various units 10 through 18 are illustrated generally in block form so that the overall connection of the apparatus can be quickly understood. Each of the blocks containing electronic circuitry have a specific embodiment of that circuitry illustrated therein, for a better understanding of the operation of the present apparatus, but it should be understood that modifications and alterations might be made to the circuitry by those skilled in the art.

Referring specifically to the first switching means 10 a relay is illustrated having an energizing coil 20, a first stationary contact 21 and associated movable contact 22 and a second stationary contact 23 and associated movable contact 24. The relay is of the type that energization of the energizing coil 20 causes movable contact 22 to engage stationary contact 21 and movable contact 24 to engage stationary contact 23 and upon deenergization of the coil 20 the contacts are disengaged. One end of the coil 20 is connected to an output terminal 25 of the power supply 16 and to the movable contact 22 associated with the coil 20, and the other end of the coil 20 is connected to the collector of a transistor 26 in the semiconductor means 11. Upon energization of the coil 20 the movable contact 22 engages stationary contact 21, thereby connecting it directly to the output terminal 25 of the power supply 16. The stationary contact 21 is connected to a positive power busline 27, which supplies positive power to the various components of the circuitry.

The power supply 16 includes a rectifying and regulating circuit adapted to be connected to a suitable source of power, such as 110 volts 60 cycles, and provides DC power of the desired voltage at the output terminal 25. A jack 28 is provided between the output terminal 25 and the rectifying and regulating circuitry so that an external source of DC voltage may be connected to the output terminal 25 and the remainder of the power supply 16 circuitry will be automatically disconnected.

The movable contact 24 associated with the energizing coil 20 is attached to the busline 27 and the stationary contact 23 associated therewith is connected through a resistor 30 to the base of the transistor 26 in the semiconductor means 11. The base of the transistor 26 is also connected through a resistor 31 to ground 32 and the emitter of the transistor 26 is connected directly to ground 32. The collector of the transistor 26 is connected to the anode of a diode 33, the cathode of which is connected to a terminal 34 in the second switching means 13. The terminal 34 is connected to one side of a manual pushbutton switch 35, the other side of which is connected to ground 32, in the condition responsive means 12 and to a jack 36. The jack 36 is provided so that various other condition responsive means, such as pressure switches, proximity switches, light-sensitive switches, etc., may be attached to the circuitry and utilized in addition to or in place of the manual switch 35. The condition responsive means 12 may be any means which operates in response to a predetermined condition and which is compatible with the remainder of the circuitry. The terminal 34 is connected through a resistor 37 to the busline 27 and through a capacitor 38 to the gate of a silicon controlled rectifier (SCR) 39.

The gate of the SCR 39 is also connected through a resistor 40 to ground 32 and the cathode of the SCR is connected directly to ground 32. The anode of the SCR 39 is connected through a resistor 41 to the busline 27 and to a terminal 45 in the connecting means 15. The resistor 41 in the anode circuit of the SCR 39 is sufficiently small so that once the SCR 39 is triggered into a conducting state it remains conducting until power is removed or substantially removed from thereacross. Thus, a positive trigger signal on the gate of the SCR 39 causes conduction thereof which does not cease until the voltage at the anode is reduced sufficiently.

The connecting means 15 includes a resistor 46 attached between the terminal 45 and a terminal 47. The terminal 47 is in turn connected to the cathode of a diode 48, the anode of which is connected to ground 32. The terminal 47 is also connected through a resistor 49 and capacitor 50 to the base of the transistor 26 in the semiconductor means 11. The terminal 47 is further connected to the anode of a diode 51, the cathode of which is connected to the anode of an SCR 55 in the sensing means 14. A capacitor 56 is connected from the terminal 45 to the anode of the SCR 55.

The anode of the SCR 55 is connected through a resistor 60 to the busline 27 and through a capacitor 61 to the ground 32. The cathode of the SCR 55 is connected directly to ground 32. The gate of the SCR 55 is connected to a two-stage amplifier generally designated 62 through a standard pulse limiting circuit generally designated 63. The input to the two-stage amplifier 62 is provided by a tape head 64 associated with the tape-driving unit 18. The tape-driving unit includes a continuous tape cartridge positioned to induce a signal in the tape head 64 and may include, for example, a two-track tape wherein a second tape head is utilized to pick off a message or the like prerecorded on the second track. The motor circuit 17 contains a filter and schematic diagram of a DC motor 65 utilized as a mechanical power source in the tape-driving unit 18. The motor circuit 17 is electrically connected directly to the busline 27 and mechanically connected to the tape-driving unit 18. Thus, whenever power is supplied to the busline 27 the motor 65 beings to operate and drive the tape-driving unit 18.

In the operation of the circuitry, operation of the condition responsive means 12 through depression of the pushbutton switch 35 or operation of some other unit attached to the jack 36, lowers the potential at the terminal 34 to approximately ground potential and completes a circuit from the power supply 16, through the energizing coil 20 and the diode 33 to ground 32. Thus, the relay is energized and movable contacts 22 and 24 engage the stationary contacts 21 and 23. When the movable contact 22 engages the stationary contact 21 power is supplied to the busline 27 and the various circuitry, including the motor circuit 17, have operating power supplied thereto. With power supplied to the motor 65 the tape-driving unit 18 begins to drive the tape past the tape head 64 and any other tracks are driven past other tape heads so that prerecorded messages thereon may be utilized. Engagement of the movable contact 24 with the stationary contact 23 applies power from the busline 27 through the resistor 30 to the base of the transistor 26. This positive voltage on the base of the transistor 26 causes the transistor 26 to begin conducting, thereby, completing a current path from the busline 27 through the energizing coil 20 and the transistor 26 to ground 32. Since the operation of the condition responsive means 12 will generally be a momentary type of operation the semiconductor means 11 is utilized to lock the switching means in an operating state. Since the bias which maintains the transistor 26 conducting is supplied through the contacts 24–23 of the relay and since the contacts 24–23 will remain closed as long as the coil 20 has sufficient current running therethrough, the switching means 10 will remain in operation until the transistor 26 of the semiconductor means 11 is cut off.

In the present embodiment, the tape in the continuous tape cartridge of the tape-driving unit 18 has a tone or signal prerecorded thereon, generally of a few seconds duration, at a position corresponding to the end of a recorded message on another channel. Thus, each time the message is completed a tone is induced into the sensing means 14 by way of the tape head 64. This signal will reoccur each time the tape completes a message or, in most instances, a complete revolution. The tone induced into the tape head 64 is amplified in the two-stage amplifier 62 and applied to the gate of the SCR 55 through the pulse-limiting circuit 63. Upon application of the signal to the gate, the SCR 55 begins conducting and a current path is completed from the busline 27 through the resistor 60 and the SCR 55 to ground 32. Conduction of the SCR 55 causes the potential at the anode thereof to drop sharply toward ground potential so that a sharp negative-going signal is applied to the connecting means 15. The resistor 60 in the anode circuit of the SCR 55 is sufficiently large so that the SCR 55 remains conducting only as long as the signal is applied to the gate circuit.

Operation of the condition responsive means 12 to lower the potential of the terminal 34 to ground potential has substantially no effect on the SCR 39 but, upon release of the condition responsive means 12 the potential at the terminal 34 tends to go sharply positive so that a sharp positive-enabling signal is applied to the gate of the SCR 39 through the capacitor 38. As previously stated, the SCR 39 continues to conduct, once triggered, until the voltage at the anode thereof is lowered beyond a certain critical value. With the SCR 39 conducting the potential at the anode is near ground potential the terminal that the potential at the terminal 47 is substantially ground potential.

When the SCR begins to conduct a sharp negative-going signal is applied to the connecting means 15. This negative-going signal has no effect on the diode 51 since the terminal 47 is substantially at ground potential. However, the negative-going signal is applied to the anode of the SCR 39 through the capacitor 56 and lowers the potential at the anode of the SCR 39 below the critical value so that conduction therethrough is terminated. With the SCR in a nonconducting state the anode raises to a potential substantially equal to that of the busline 27 and the potential at the terminal 47 also raises to approximately the same potential. When the tape-driving unit 18 induces the second signal into the tape head 64 causing the SCR 55 to begin conducting, the second or reoccurring negative-going pulse applied to the connecting means 15 passes through the diode 51, the resistor 49, the capacitor 50 and is applied to the base of the transistor 26. This negative-going signal applied to the base causes the transistor 26 to cut off deenergizing the relay and opening the sets of contacts 22–21 and 24–23. Deenergizing the relay or first switching means 10 removes power from the busline 27, thereby, stopping the entire apparatus until the condition responsive means 12 operates again.

Thus, the tape-driving unit 18 will drive the tape through two complete revolutions, or sufficiently far to produce two signals in the tape head 64, before the entire circuitry is deactivated. If at any time after the first negative-going pulse is produced by the sensing means 14 to cause conduction to stop in the SCR 39 (and prior to the generation of the second negative-going pulse by the sensing means 14), the condition responsive means 12 is operated, the SCR 39 will again be triggered into conduction and the generation of a subsequent negative-going signal by the sensing means 14 will terminate conduction in the SCR 39, but will not pass through the connecting means 15 to cut off the transistor 26. Thus, another complete revolution of the tape in the tape- driving unit 18 will occur before the circuitry is deenergized. It should be noted that the triggering of the SCR 39 and the sharply negative-going potential at the terminal 45 has no effect on the transistor 26 because of a relatively large value for the resistor 46. Because of the relatively large resistor 46 and the remainder of the circuitry, the potential at the terminal 47 is lowered to approximately ground potential at a rate which does not effect the transistor 26. Thus, only the sharp negative-going signal from the anode of the SCR 55, when the terminal 47 is at a high potential, passes through the connecting means 15 to the base of the transistor 26 and deenergizes the circuit.

The present circuitry is designed to provide two complete revolutions of the continuous tape in the tape driving unit 18 after the actuation of the condition responsive means 12 and another complete revolution of the tape if the condition responsive means 12 is actuated at any time during the second revolution of the tape. It should be understood however that any number of revolutions of the tape can be provided through the incorporation of additional second switching means 13 and connecting means 15. Further, the tape-driving unit 18 and the continuous tape thereon is only utilized for exemplary purposes and any other device might be utilized in conjunction with a compatible sensing means 14 to supply a reoccurring signal to the connecting means 15. Thus, an electronic sequencing circuit is described which accurately and simply provides for a particular sequence of occurrences or signals in response to a predetermined condition. For example, the condition responsive means 12 may be a device for sensing the presence of an automobile whereupon the circuitry is energized to transmit a prerecorded message twice. After the prerecorded message is transmitted twice, if no additional automobiles are sensed, the circuitry will automatically be deenergized. Further, in the deenergized state the circuitry requires substantially no electrical power so that it is economical to operate, in addition to being automatic, so that the circuitry can be utilized in remote or unattended locations.

What is claimed is:

1. An electronic sequencing circuit adapted to be connected to a suitable source of power and a controllable signal producing device comprising:

a. switching means being of the type that remain operating as long as electrical power is applied thereto, said switching means being adapted to connect the controllable signal-producing device to the suitable source of power;

b. semiconductor means connected in circuit with said switching means so that operation thereof completes a circuit between upon switching means and the suitable source of power and further connected so that operation of said switching means applies a signal to said semiconductor means tending to maintain said semiconductor means in the operating state;

c. condition responsive means connected to said switching means to momentarily apply electrical power to said switching means upon the occurrence of a predetermined condition;

d. sensing means having an input adapted to have applied thereto a reoccurring signal from the controllable signal-producing device when the controllable signal-producing device is connected to the suitable source of power and an output with signals thereon corresponding to signals applied to the input thereof;

e. second switching means being of the type that remains conducting upon switching thereof until electrical power is substantially removed therefrom, said second switching means having an input connected to said condition responsive means for causing switching of said second switching means upon removal of the momentary electrical power; and f. means connecting the output of the sensing means and the second switching means together and to the semiconductor means so that the occurrence of a signal at the output of said sensing means removes electrical power from said second switching means and a subsequent occurrence of the signal at the output of said sensing means causes said semiconductor means to cease operating.

2. An electronic sequencing circuit as set forth in claim 1 wherein the controllable signal-producing device includes a continuous tape-type playback device and the sensing means includes a magnetic head and amplifier.

3. An electronic sequencing circuit as set forth in claim 1 wherein the second switching means includes a silicon-controlled rectifier.

4. An electronic sequencing circuit adapted to be connected to a suitable source of power comprising:

a. continuous tape playback apparatus including tape with a signal prerecorded thereon for producing a reoccurring electrical signal at an output thereof upon connection of said playback apparatus to the source of power;

b. electrical relay means connected to said playback apparatus and adapted to be connected to the source of power for connecting said playback apparatus to the source of power upon operation of said relay means;

c. a semiconductor device connected in circuit with said relay means so that conduction thereof completes a circuit between said relay means and the source of power and further connected so that operation of said relay means applies a signal to said semiconductor device tending to maintain said semiconductor device in the conducting state;

d. momentary switching means connected to said relay means for momentarily applying electrical power to said relay means upon operation of said momentary switching means;

e. silicon-controlled rectifier means having an input connected to said momentary switching means for causing conduction of said silicon-controlled rectifier means upon removal of the momentary electrical power; and f. means connecting the output of said playback apparatus to the semiconductor and to the silicon-controlled rectifier so that the occurrence of the prerecorded signal at the output of said playback apparatus removes electrical power from the silicon-controlled rectifier and a subsequent occurrence of the signal at the output causes said semiconductor device to cease conduction.

5. An electronic sequencing circuit comprising:

a. first switching means;

b. semiconductor means connected in circuit with said first switching means so that operation of said semiconductor means completes a circuit between said first switching means and a suitable source of power and further connected so that operation of said first switching means applies a signal to said semiconductor means tending to maintain said semiconductor means in the operating state;

c. condition responsive means connected to said first switching means to momentarily apply electrical power to said first switching means upon the occurrence of a predetermined condition;

d. signal-producing means having an output with a reoccurring signal thereon;

e. second switching means having an input connected to said condition responsive means for causing said second switching means to operate upon removal of the momentary electrical power; and f. means connecting the output of the signal-producing means to the second switching means and to the semiconductor means so that the occurrence of a signal at the output of said signal-producing means causes said second switching means to cease operating and a subsequent occurrence of the signal at the output of said signal-producing means causes said semiconductor means to cease operating.

6. An electronic sequencing circuit as set forth in claim 5 wherein the connecting means includes an RC network and a plurality of diodes connected so that operation of said second switching means biases said connecting means to prevent passage of the signal at the output of the signal-producing means, upon the first occurrence thereof, to the semiconductor means.

7. An electronic sequencing circuit as set forth in claim 5 including means connecting the first switching means and the signal-producing means so that operation of said first switching means energizes said signal-producing means.

8. An electronic sequencing circuit comprising:

a. switching means having a conducting and a nonconducting state and a gate circuit for switching said switching means from the nonconducting to the conducting state upon the application of a signal to said gate circuit, said switching means being further characterized by remaining in the conducting state after the termination of the signal until power is substantially removed from thereacross;

b. signal means connected to said gate circuit for applying a signal to said gate circuit and placing said switching means in the conducting state upon operation of said signal means; and c. connecting means having an input adapted to receive reoccurring pulses of a polarity and magnitude sufficient to counteract power applied to said switching means to simulate removal of power from thereacross and an output, said connecting means being connected to said switching means so that when said switching means is in the conducting state said connecting means is biased to prevent the passage of pulses from the input to the output, said connecting means being further connected to said switching means so that the first pulse of the reoccurring pulses counteracts power applied to said switching means and causes the switching thereof from the conducting to the nonconducting state to unbias the connecting means and allow the passage of a subsequent pulse to the output of the connecting means.